(12) United States Patent
Ternasky et al.

(10) Patent No.: US 7,777,902 B2
(45) Date of Patent: Aug. 17, 2010

(54) SYSTEM AND METHOD FOR GENERATING RESOLUTION-INDEPENDENT OUTPUT VIA VISUAL TREE OBJECT

(75) Inventors: Joseph D. Ternasky, Mountain View, CA (US); Robert L. C. Parker, San Jose, CA (US); Michael M. Byrd, Bellevue, WA (US); Adam Eversole, Redmond, WA (US); Joseph King, Seattle, WA (US); Michael Stokes, Eagle, ID (US); Oliver H. Foehr, Mercer Island, WA (US)

(73) Assignee: Microsoft Corporation, Redmond, WA (US)

(*) Notice: Subject to any disclaimer, the term of this patent is extended or adjusted under 35 U.S.C. 154(b) by 1208 days.

(21) Appl. No.: 10/848,002

(22) Filed: May 19, 2004

(65) Prior Publication Data

US 2005/0243333 A1    Nov. 3, 2005

Related U.S. Application Data

(60) Provisional application No. 60/567,173, filed on May 3, 2004.

(51) Int. Cl.
*G06F 15/00* (2006.01)
(52) U.S. Cl. .................. 358/1.15; 358/1.2; 358/1.13; 358/1.9; 400/76
(58) Field of Classification Search .............. 358/1.2, 358/1.13, 1.15, 1.9; 715/760, 502, 513; 395/108; 709/203; 400/76; 345/420
See application file for complete search history.

(56) References Cited

U.S. PATENT DOCUMENTS

| | | | | |
|---|---|---|---|---|
| 5,644,683 A | * | 7/1997 | Ross et al. ................... 358/1.8 |
| 6,570,587 B1 | * | 5/2003 | Efrat et al. ................... 715/723 |
| 6,625,615 B2 | * | 9/2003 | Shi et al. ................. 707/103 R |
| 6,654,507 B2 | * | 11/2003 | Luo ........................... 382/282 |
| 6,671,853 B1 | * | 12/2003 | Burkett et al. ............... 715/235 |
| 6,952,286 B2 | * | 10/2005 | Luo et al. .................... 358/1.9 |
| 7,292,255 B2 | * | 11/2007 | Doan et al. .................. 345/629 |
| 2002/0075261 A1 | * | 6/2002 | Brokenshire et al. ........ 345/420 |
| 2002/0095422 A1 | * | 7/2002 | Burrows et al. ............. 707/100 |
| 2002/0111963 A1 | * | 8/2002 | Gebert et al. ............... 707/513 |
| 2003/0202010 A1 | * | 10/2003 | Kerby et al. ................ 345/744 |
| 2004/0179221 A1 | * | 9/2004 | Endo et al. .................. 358/1.13 |
| 2004/0194020 A1 | * | 9/2004 | Beda et al. .................. 715/502 |
| 2004/0246514 A1 | * | 12/2004 | Clough et al. .............. 358/1.14 |
| 2005/0046887 A1 | * | 3/2005 | Shibata et al. ............. 358/1.13 |
| 2005/0108649 A1 | * | 5/2005 | Ueda .......................... 715/760 |
| 2005/0141941 A1 | * | 6/2005 | Narusawa et al. ............. 400/76 |

* cited by examiner

*Primary Examiner*—King Y Poon
*Assistant Examiner*—Allen H Nguyen
(74) *Attorney, Agent, or Firm*—Shook, Hardy & Bacon

(57) ABSTRACT

A system and related techniques generate printing and other output operations via a resolution-independent visual tree object. According to embodiments the operating system or other resource may receive the visual tree object and related data from applications or other sources, and perform logic to scale or process the visual output for resolution, effects or other purposes directly from that object. The operating system or other resource itself may be configured to receive the componentized visual tree object and condition or render that object for output to a printer, facsimile machine, copy machine or other output device. The operating system may serialize or spool that object from the source object in native form, relieving applications of the need to prepare documents or other output objects to generate specified resolutions, effects or to adapt the output to specific output drivers.

9 Claims, 4 Drawing Sheets

SYSTEM AND METHOD FOR GENERATING RESOLUTION-INDEPENDENT OUTPUT VIA VISUAL TREE OBJECT

CROSS-REFERENCE TO RELATED APPLICATION

This application claims the benefit of U.S. Provisional Application Ser. No. 60/567,173 filed May 3, 2004, entitled "System and Method for Generating Resolution-Independent Output Via Visual Tree Object", which application is assigned or under obligation of assignment to the same entity as this application, from which application priority is claimed, and which application is incorporated by reference herein.

STATEMENT REGARDING FEDERALLY SPONSORED RESEARCH OR DEVELOPMENT

Not applicable.

FIELD OF THE INVENTION

The invention relates to the field of computing, and more particularly to a platform for generating a universal visual tree object which may be accepted by an operating system or other resource to condition and prepare printed page or other output, with no dependencies on output resolution or requiring special preparation by the source application sending the object to a printer or other output device.

BACKGROUND OF THE INVENTION

The problem of generating reliable, accurate printed output on a printer or other output device has occupied application programmers, operating system designers, printer and other hardware engineers and others for some time. In general, printed, facsimile or other output has been subject to inconsistencies such as misaligned pages, improperly formed characters or fonts, limited or poorly executed effects such as shadowing or kerning, or other problems due to the technical issues surrounding the printing chain.

For one, and as illustrated in FIG. 1, generating a printed page or other output typically begins with an application such as a word processing package, presentation package, spreadsheet or other application generating a document, slide show, spreadsheet or other file, object or data to send to a printer or other output device.

The application usually accesses an application programming interface (API) in the operating system to transmit that file to the operating system for output spooling and processing. The application may be required to conform to the API for instance by passing constituent text, numerical, graphical or other data as well as arguments and variables related to the resolution, font, page size and other characteristics of the output file. The API may then invoke other resources of the operating system to serialize or spool the file for transmission to the printer or other output device.

The operating system may communicate the spooled file or other data to a printer driver, for example a software interpreter or commands and functions, resident in the operating system or supplied by the hardware manufacturer. The printer driver may then transmit the resulting processed output data to the printer hardware via a serial, parallel or other connection. The printer or other output device may then process the received document or other object to generate a printed page, for instance using a print engine containing routines, fonts, logic control and other information which is embedded in the printer.

The series of conventional processing and conversion steps which translate an original source file to a form for ultimate printing introduces multiple chances for errors and incompatibilities between source data and physical output. For one thing, not all applications are aware of the font, effects and other processing limitations of given printers or other output devices. For another, the APIs presented to applications may be hardwired to specifications which do not permit substitution or extension of fonts or other effects or processing. Moreover, interposing a manufacturer-specific printer driver or other driver between the operating system and output device only increases the possibility of incompatible fonts, routines or commands. Other problems in printing and other output technology exist.

SUMMARY OF THE INVENTION

The invention overcoming these and other problems in the art relates in one regard to a system and method for generating resolution-independent output via a visual tree object, in which an application or other source may create, store and manipulate an abstracted visual tree object. The application or other source may transmit that visual tree object to an operating system for print or other output conditioning, for instance to parse that object to spool or serialize the content. The conditioned visual tree object may be communicated to a printer, copy machine or other output device in that form, for printing or other output. In embodiments, the visual tree object may retain its resolution independence throughout the print output process. The operating system and related resources may therefore directly receive and manipulate the visual tree object without reliance on an intermediate API or similar interface, and applications need not conform file parameters to API requirements. Because the same visual tree object is used for on-screen visual display as well as for printing and other output activity, the ability to match visually perceived displays to printed or other output is greatly enhanced.

DETAILED DESCRIPTION OF EMBODIMENTS

Figure 1:
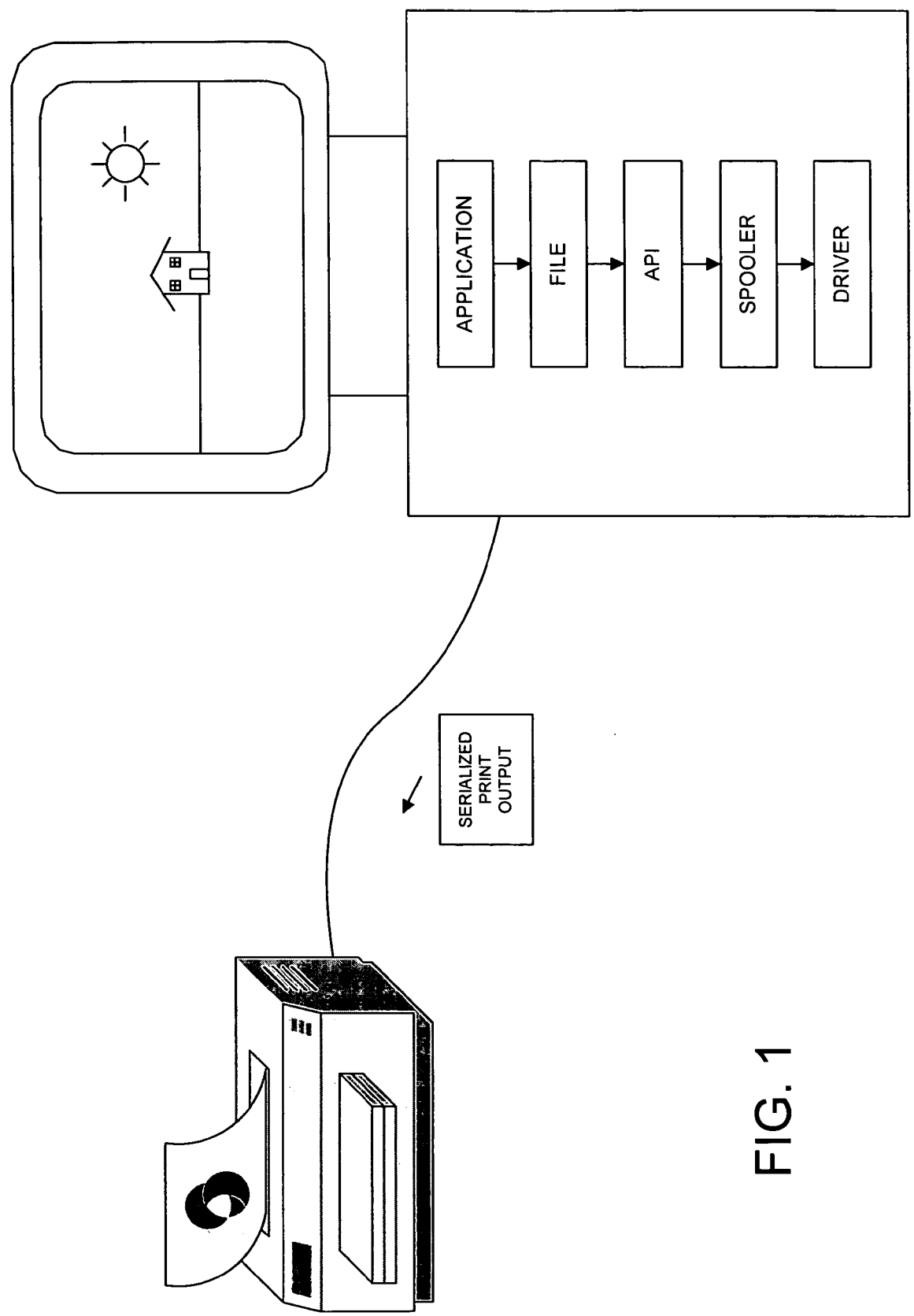
FIG. 1 illustrates a printing output process, according to known print technologies.
Figure 2:
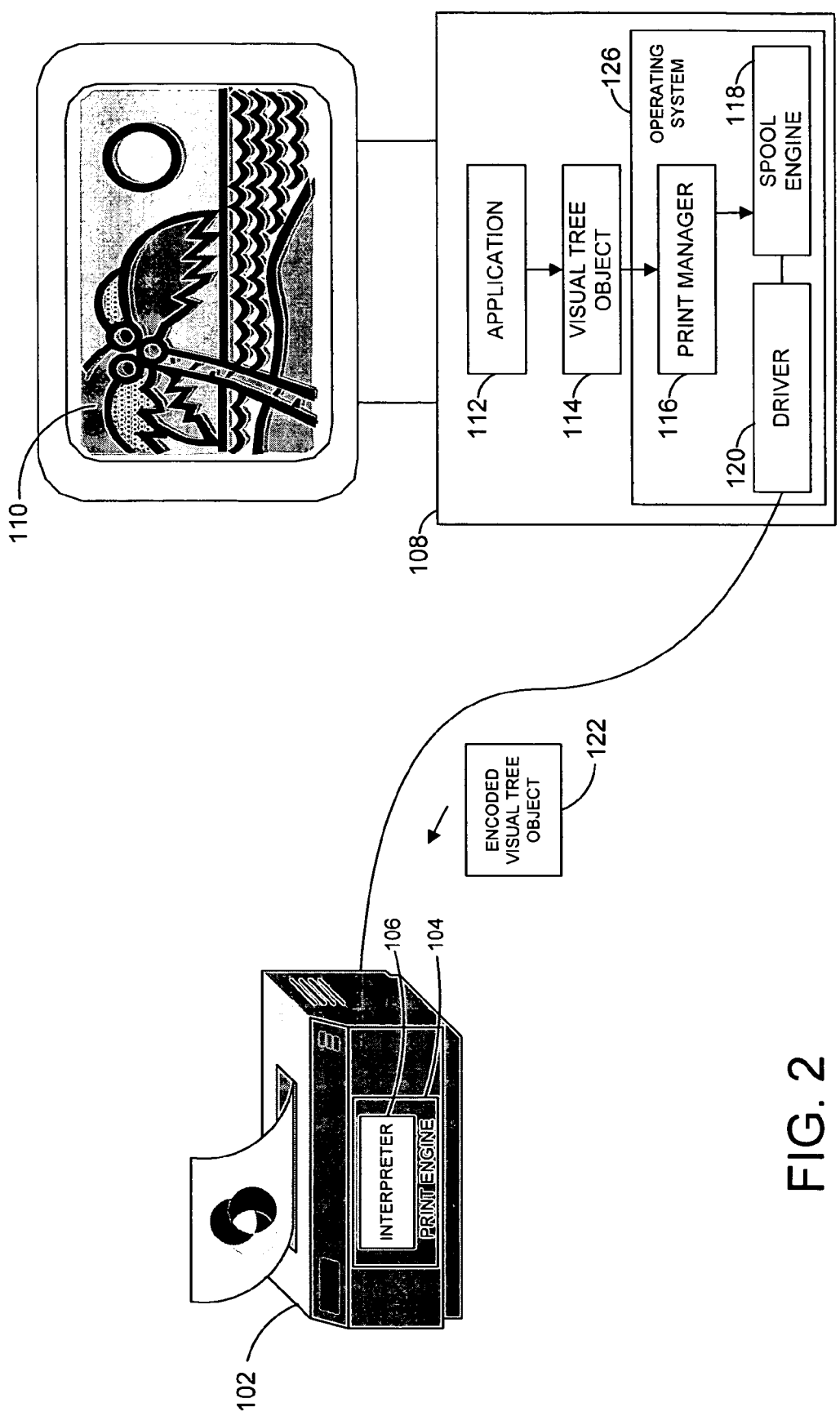
FIG. 2 illustrates an environment in which a platform for generating resolution-independent visual tree object may operate, according to embodiments of the invention.

FIG. 2 illustrates an architecture in which a system and method for may operate, according to an embodiment of the invention. As illustrated in that figure, a user may operate a client 108 using a user interface 110 to execute one or more application 112, and generate an output from printer 102 or other output device. The application 112 may be or include, for example, a word processing application, a spreadsheet or database application, a slide show application, a browser or email application, an image editing or other graphical application, or other application, package or utility which may generate a visual tree object 114 for output.

The visual tree object 114 may in embodiments be or include a hierarchical data schema encapsulating a screen, text file, image file or other object for printing, facsimile transmission, copying or other output. The visual tree object 114 may be encoded, for example, in extensible markup language (XML) or other code, instructions or formats. According to embodiments, the application 112 may build the visual tree object 114 based on the textual, graphical or other elements of the file or content which the user has generated in application 112. For example, application 112 may as shown operate on a graphical image, textual or other content, whose elements or components may be enumerated in a tree-style or hierarchical data object.

According to embodiments of the invention in one regard, the application 112 may communicate the visual tree object 114 or other output content to an operating system 126 operating on client 108, to condition and transmit that content to printer 102 for printing or other output. In embodiments as shown, the visual tree object 114 may be transmitted to a print manager 116, which may contain control logic for initiating and generating printed or other output. In embodiments print manager 116 may be or include a built-in facility within operating system 126, which however does not require or depend on the presentation of APIs to application 112 to conduct printing setup and output operations. In embodiments, the visual tree object 114 may be, include or be embedded in or associated with an electronic document of the type described in the aforementioned copending U.S. patent application Ser. No. 10/836,327, entitled "Document Markup Methods and Systems", or others.

Print manager 116 may in turn communicate with a spool engine 118. Spool engine 118 may contain logic or intelligence to serialize or otherwise decompose the visual tree object 114 for transmission to the printer or other output device as encoded visual tree object 122. Spool engine 118 may likewise be hosted or included within operating system 126. Spool engine 118 may communicate the encoded visual tree object 114 to a driver 120, which may be or include general or specific codes or routines to drive the encoded visual tree object 122 to printer 102 for printing or other output.

The driver 120 may transit the encoded visual tree object 114 to the printer over a connection such as a serial connection, a parallel connection, a universal serial bus (USB) connection, a wireless connection or other port or connection. The printer 102 may receive the encoded visual tree object 122 for processing and output. In embodiments, the printer 102 may contain a print engine 104 including an interpreter 106 or other print control logic, which may parse the visual tree object 122 and generate pixels or other output to be printed on pages, for example via a line or other output buffer. In embodiments interpreter 106 may be configured to decode electronic documents or commands of the type described in the aforementioned U.S. patent application Ser. No. 10/836,327, entitled "Document Markup Methods and Systems", or others.

Figure 3:
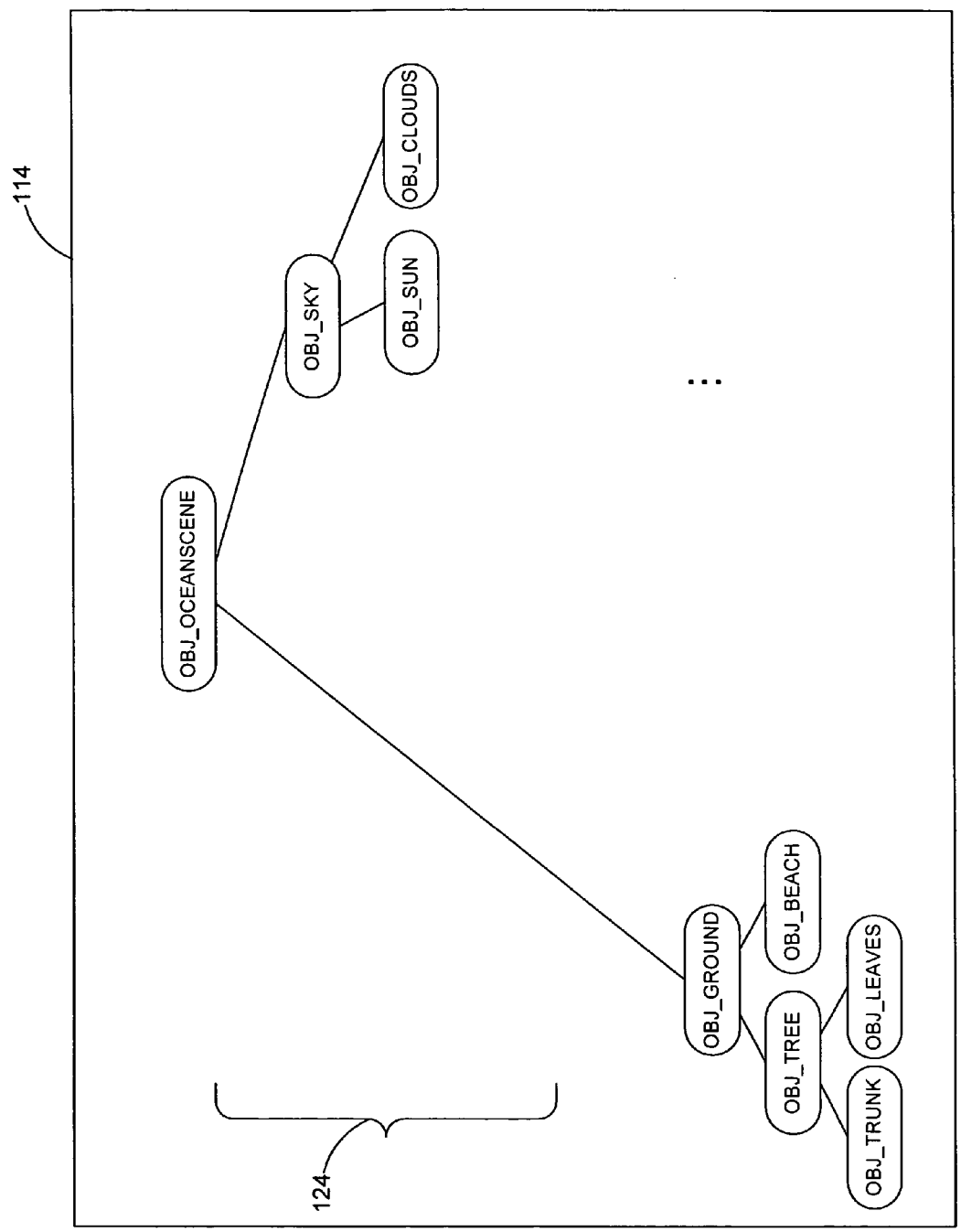
FIG. 3 illustrates an example of a visual tree object generated for output purposes, according to embodiments of the invention.

FIG. 3 shows an exemplary visual tree object 114, including a set of components 124 illustratively including a set of descending nodes describing or encapsulating a graphical object scene (OBJ_OceanScene). In embodiments as shown, the root node may descend or connect to various constituent nodes, each containing elements of the content displayed on user interface 110 and/or directed for output on printer 102 or other output device. In embodiments each of the nodes in the set of components 124 may be or include graphical, character, textual, font, effect or other content, code or data. In embodiments the visual tree object 114 may be built in XML or XML-based code, or in other code or formats. According to embodiments of the invention in one regard, because print manager 116 and other resources of operating system 126 may accept the visual tree object 114 directly, without an intermediate API or other mediating interface, application 112 or other source of the content to be printed need not attempt to process or conform the content for output. Again, since both the displayed visual content viewed by the user and the printed or other output is generated from the same visual tree object 114, perceived output consistency may be significantly enhanced.

Moreover, since the content may be completely represented in a standard visual tree object 114 without dependency on APIs or idiosyncratic print functions based on individual manufacturer specifications, the visual tree object 114 may be constructed in a resolution-independent format. The scaling and other conditioning of the content for printing or outputting the visual tree object 114 on a given printer 102 may instead be performed in printer manager 116, spool engine 118 or other operating system or other resources. Again, electronic documents of the type described in copending U.S. patent application Ser. No. 10/836,327, entitled "Document Markup Methods and Systems" or others may contain intermediate language or other interpretable or executable code, which may in one regard encode instructions for scaling, sizing, font or other content or effects. Further, since visual tree object 114 does not necessarily require conversion steps before being sent to print or other output, a round-trip transmission of the visual tree object 114 is possible according to embodiments of the invention. Thus for instance print manager 116 may store a visual tree object 114 before or after it has been printed or otherwise output to a file. A viewer tool or other application or resource may then be able to view that object in the form in which it was displayed, printed or otherwise processed or output, for instance to preview, print or otherwise manipulate that object at a later time.

Figure 4:
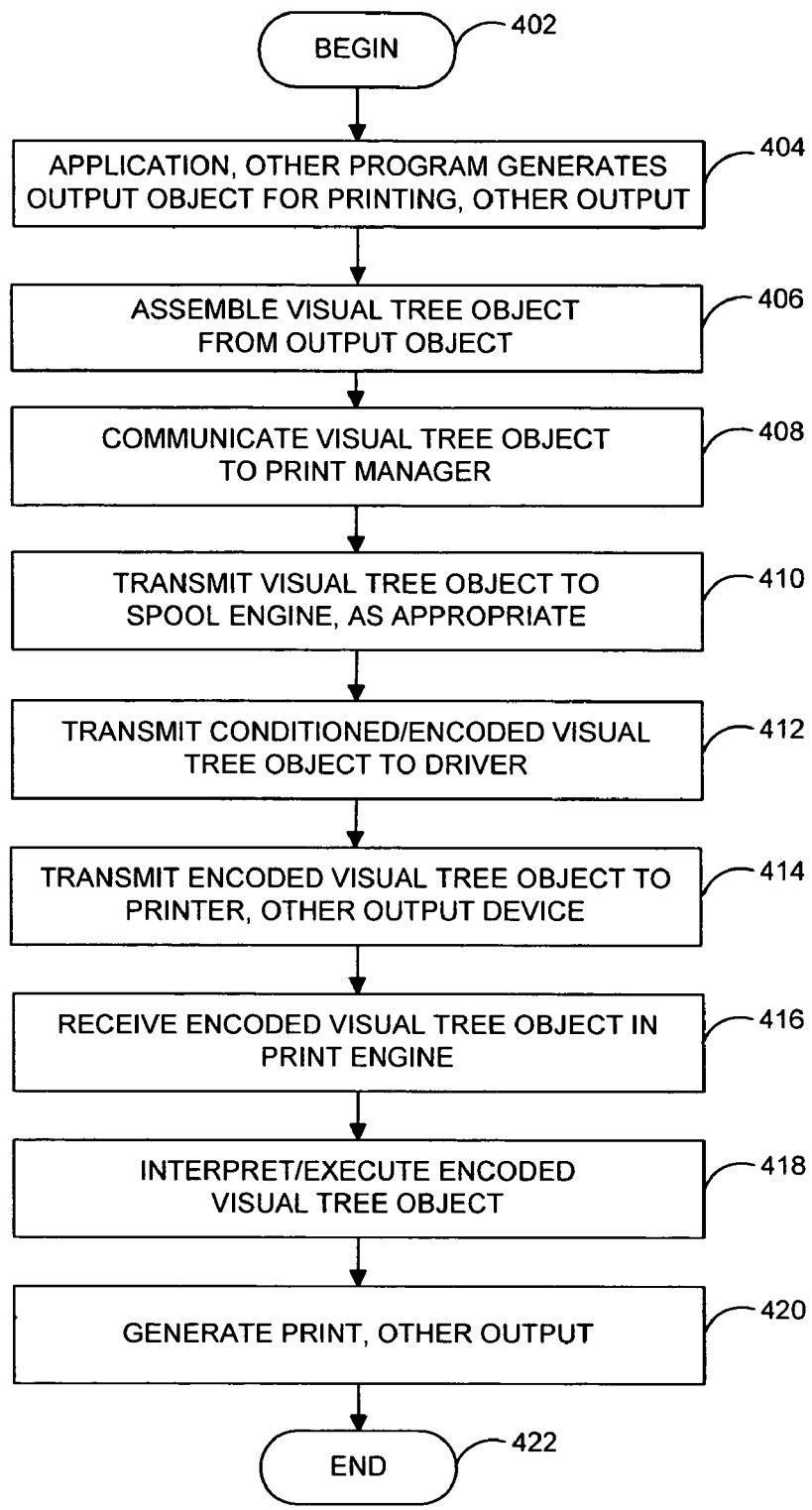
FIG. 4 illustrates a flowchart of overall output processing using a visual tree object, according to embodiments of the invention.

FIG. 4 illustrates a flowchart of overall print or other output processing using a visual tree object, according to embodiments of the invention. In step 402, processing may begin. In step 404, application 112 or other program or other source may generate an output object for printing or other output, such as for example a word processing document or file, a slide in a slide show application, a digital photograph or other content. In step 406, the output object may be assembled into a visual tree object 114, for instance by the application 112 decomposing the output object or content into a set of hierarchical visual elements, or otherwise.

In step 408, the visual tree object 114 may be communicated to print manager 116 or other print control logic, for instance hosted in an operating system or other resource. In step 410, the visual tree object 114 may be transmitted to spool engine 118 or other conditioning logic, for instance to generate an encoded visual tree object 122, for instance containing a corresponding sequence of serialized data or commands. In embodiments, the encoded visual tree object 122 may be, include or be embedded in or associated with an electronic document of the type described in the aforementioned U.S. patent application Ser. No. 10/836,327, entitled "Document Markup Methods and Systems", or otherwise. The conditioning performed on visual tree object 114 may in one regard preserve the structure of that object, so that in one regard that change in form of the visual tree object 114 may be thought of as an isomorphic transform. In step 412, the encoded visual tree object 122 may be transmitted to driver 120, such as a printer driver or other output interface or resource. In step 414, the encoded visual tree object 122 may be transmitted to printer 102 or other output device, for instance via a serial port, parallel port, USB connection, wireless connection or other port or connection.

In step 416, the encoded visual tree object 122 may be received in printer 102 or other output device, for instance being stored into electronic memory or otherwise. In step 418, the encoded visual tree object 122 may be interpreted, executed, decoded or otherwise processed in print engine 104 of printer 102, for example rasterizing an image object or initiating fonts, routines, effects or other data. In step 420, the printed page or other physical or media output may be generated, for instance on paper or other media. In step 422, processing may repeat, return to a prior processing point, jump to a further processing point or end.

The foregoing description of the invention is illustrative, and modifications in configuration and implementation will occur to persons skilled in the art. For instance, while the invention has generally been described in terms of an application or other source passing a single visual tree object 114 to a printer 102, in embodiments multiple or combined visual tree objects may be transmitted to the printer or other o device for outputting.

Similarly, while the invention has in embodiments been described as involving a visual tree object 114 whose internal structure is built on a two dimensional descending tree, in embodiments the visual tree object 114 may contain other internal structures, such as three-dimensional trees or lattices, four (or more) dimensional objects, or other configurations structures. Other hardware, software or other resources described as singular may in embodiments be distributed, and similarly in embodiments resources described as distributed may be combined. Further, while the invention has generally as operating in conjunction with one or more local applications which generate the visual tree object 114, in embodiments the visual tree object 114 may originate from other sources, such as distributed Web or other applets, be read from media, downloaded from the Internet or be derived or receive from other sources. The scope of the invention is accordingly intended to be limited only by the following claims.

We claim:

1. A system for generating output based on a visual tree comprising:
    an input interface to receive visual tree object directly from an application program without mediation by an intermediate application programming interface wherein the visual tree object is constructed of a set of components enumerated in a resolution-independent, hierarchical data object, and wherein the set of components includes descending nodes that each describe a visual element for representing content;
    a print management module, the print management module communicating with the input interface to receive the visual tree object and condition the visual tree object for output; and
    an output interface to an output device, the print management module being configured to transmit the conditioned visual tree object to the output device via the output interface.

2. A system according to claim 1, wherein the visual tree object comprises the set of components enumerated in the hierarchical data object, that generate a representation of visual output data in a printed form consistent with a representation of the visual output data as viewed by a user on a user-interface display.

3. A system according to claim 2, wherein the hierarchical data object is built in extensible markup language code.

4. A system according to claim 1, wherein the conditioning performed by the print management module comprises conditioning the visual tree object for serialized output via the output interface.

5. A system according to claim 4, wherein the conditioning comprises parsing the visual tree object to generate the serialized output without the requirement of applying conversion steps to the visual tree object precedent to transmission to the output device.

6. A system according to claim 1, wherein the conditioning comprises decomposing the visual tree object into output device primitives and encoding instructions for implementing at least one of scaling, sizing, or content effects.

7. A system according to claim 1, wherein the output interface comprises at least one of a serial port, a parallel port, a universal serial bus connection, and a wireless connection.

8. A system according to claim 2, wherein the print management module is configured for storing the visual tree object such that a viewer tool may access the stored visual tree object and display the representation of the visual output data on the user-interface display from the stored visual tree object.

9. A system according to claim 1, wherein the output device comprises at least one of a printer device, a facsimile device, a copy machine and a multi-function device.

* * * * *